Reissued Feb. 7, 1933

Re. 18,730

UNITED STATES PATENT OFFICE

EDWIN W. COLT, OF GLEN ELLYN, ILLINOIS, ASSIGNOR, BY MESNE ASSIGNMENTS, TO ARMOUR AND COMPANY OF DELAWARE, OF CHICAGO, ILLINOIS, A CORPORATION OF DELAWARE

HEAT TREATMENT OF GARNET ABRASIVE

No Drawing. Original No. 1,836,448, dated December 15, 1931, Serial No. 483,763, filed September 22, 1930. Application for reissue filed January 25, 1932. Serial No. 588,807.

Crushed garnet, particularly the almandite and rhodolite varieties, have been in use to an increasing extent as an abrasive bonded to the surface of fabrics such as paper and cloth by means of glue or other suitable adhesive, both in what is known as closed and open coat; generally speaking, the former for working hard wood and the latter soft wood and other substances.

It has been suggested that the capillarity of crushed abrasives, including garnet, may be improved and the bonding action of the glue or other adhesive may be enhanced by heat treatment at low temperatures of from 200° to 350° C., whereby to drive off the moisture and other surface impurities, this heat treatment being at temperatures not sufficiently high to affect the grains as to their chemical or physical characteristics.

Almandite and rhodolite, those varieties of garnet most available for commercial use as an abrasive, contain a considerable percentage of iron in a ferrous form and a smaller percentage of iron in the ferric form. These percentages are not affected by known heat treatment at moderate temperatures, that is to say sufficient to drive off surface moisture and eliminate adhering combustible impurities.

I have discovered, however, that if the crushed garnet be roasted in a suitable furnace at temperatures of from 400° to 950° C. for a period of from four to sixteen hours, the physical and chemical properties of the garnet are changed in an unexpected manner and to a remarkable degree.

The fracture is improved, the grains change in color to a deeper red, glisten as if wet, assume metallic luster, become harder, tougher and sharper, the abrasive qualities being greatly improved.

The term "hardness" is employed herein and in the appended claims, as applied to abrasives, to denote resistance both to wear and fracture; and the term "sharpness" is employed to denote the maintenance of a sharp edge due to the hardness of the abrasive.

An analysis indicates that, as compared with the untreated garnet or garnet treated at a low temperature to improve capillarity, the new product has some of the iron in the ferrous form converted into the ferric form; that is, the ferric content is increased at the expense of the ferrous content.

Temperatures and time of treatment may be varied to a considerable extent; treatment at a lower range of roasting temperatures over a longer period of time being comparable with roasting over a shorter period of time at higher temperatures. Satisfactory results may be attained by gradually lowering the temperature from its highest point over an extended period of time, or quickly reducing the temperature at the end of the period of treatment to secure a desirable tempering. Continued treatment at temperatures of approximately 1000° C. and above, however, appears to have a detrimental reactionary effect, the material tending to lose its crystalline structure and to break down, approaching an amorphous condition.

Exhaustive work tests demonstrate that roasted garnet fabric, paper or cloth, is as superior to unroasted garnet fabric as the latter is to ordinary sandpaper, whether applied in a closed coat or in an open coat. A given sample of garnet fabric, the coating of which has been roasted, whether used on a belt or drum sander or otherwise, shows a capacity to abrade approximately twice the area as untreated garnet. The retention of the grains by the bond is further improved, the hardness and sharpness of the grains and consequent cutting efficiency is increased, and the useful life of the garnet fabric in service is prolonged.

I claim:

1. As an abrasive, crushed garnet roasted at sufficiently high temperature over a sufficiently extended period of time to convert a portion of the iron in ferrous form into the ferric form, said roasted garnet being characterized by a deeper red color and having an increased hardness.

2. Method of producing an abrasive, which comprises roasting garnet at a temperature sufficiently high and for a period of time sufficiently long to increase the ferric content of the garnet, said temperature and time being maintained sufficiently low and short to preserve the crystalline structure of the garnet.

3. As an abrasive, crushed garnet roasted at a temperature of from 400° C. to 950° C. for a period of time varying from four to sixteen hours, said garnet being characterized by a darker color, and a harder and sharper grain than ordinary garnet.

4. The method of treating garnet to improve the hardness and sharpness of the grain, which comprises roasting crushed garnet grains for a period of from four to sixteen hours and at temperatures ranging from 400° C. to 950° C.

5. The method of producing an abrasive which comprises roasting crushed garnet grains for a period of from four to sixteen hours and at a temperature of 400° C. to 950° C.

6. As an abrasive, crushed garnet roasted at a temperature of from 400° C. to 950° C. for a period of time varying from four to sixteen hours, said garnet being characterized by a darker color, and having an increased hardness and a higher ferric content than the unroasted garnet.

7. The method of producing a garnet abrasive, which comprises roasting the garnet at a temperature sufficiently higher than that required to improve the capillarity of the garnet and drive off moisture and other surface impurities and for a time sufficiently long to materially improve the hardness of the garnet, said temperature being below that at which the crystalline structure of the garnet is destroyed.

8. The method of producing a garnet abrasive, which comprises roasting garnet at a temperature between 400° C. and 950° C. and in excess of the temperature required to improve the capillarity and drive off moisture and other surface impurities, and for a time sufficiently longer than that required to improve the capillarity whereby to materially improve the hardness of the garnet.

9. The method of producing a garnet abrasive, which comprises roasting garnet at a temperature between 400° C. and 950° C. and for a period of time sufficiently long to materially improve the hardness of the garnet.

In testimony whereof I have hereunto subscribed my name.

EDWIN W. COLT